United States Patent
Izumi et al.

(10) Patent No.: US 6,503,469 B2
(45) Date of Patent: Jan. 7, 2003

(54) METHOD FOR PROCESSING POLLUTED FLUID CONTAINING POLLUTANTS

(75) Inventors: Jun Izumi, Nagasaki (JP); Akinori Yasutake, Nagasaki (JP); Nariyuki Tomonaga, Nagasaki (JP); Hiroyuki Tsutaya, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 37 days.

(21) Appl. No.: 09/338,325

(22) Filed: Jun. 22, 1999

(65) Prior Publication Data

US 2001/0001651 A1 May 24, 2001

(30) Foreign Application Priority Data

Jun. 22, 1998 (JP) ............................................. 10-174866
Jun. 22, 1998 (JP) ............................................. 10-174867

(51) Int. Cl.⁷ .......................... B01D 15/00; B01D 53/02
(52) U.S. Cl. ................. 423/210; 423/245.1; 423/239.1; 423/244.01; 423/245.3; 210/660; 210/673; 210/760; 588/205
(58) Field of Search ............................... 423/210, 245.3, 423/245.1, 239.1, 244.01; 588/205; 210/673, 660, 760

(56) References Cited

U.S. PATENT DOCUMENTS

| 4,941,957 A | 7/1990 | Zeff et al. ................. 204/157.3 |
| 5,248,395 A | 9/1993 | Rastelli et al. ................. 203/41 |

FOREIGN PATENT DOCUMENTS

| DE | 37 18 370 A1 | * | 12/1988 | |
| EP | 0 492 169 A1 | * | 7/1992 | ............... 423/245.3 |
| EP | 0 599 271 A1 | * | 6/1994 | ............... 423/245.3 |
| EP | 0792835 A1 | | 9/1997 | |
| JP | XP-002183176 | | 3/1979 | |
| JP | 55020609 | | 2/1980 | |
| JP | 63-190620 A | * | 8/1988 | |
| JP | 5-137942 A | | 6/1993 | |

OTHER PUBLICATIONS

Sep. 28, 2001 Korean official action & English–language translation thereof.
C.T. Kresge, M.E. Leonowiez, W.J. Roth, J.C. Vartuli and J.S. Beck, Nature, 359, 710 (1992) Oct. 22, 1992.
S. Inagaki, Y. Fukushima and K. Kuroda, J. Chem. Soc., Chem. Commun., 680 (1993).
Q. Huo, D.I. Margolese, U. Ciesla, D.G. Demuth, P. Peng, T.E. Gier, P. Siger, A. Firouzi, B.F. Chmelka, F. Schuth and G.D. Stucku, Chem. Mater., 6, 1176 (1994).
Y.M. Setoguchi, Y., Teraoka, I. Moriguchi, S. Kagawa, N. Tomoaga, A. Yasutake, and J. Izumi, Journal of Porous Materials, 4, 129–134 (1997).
English Abstracts (DWPI & JPAB) for JP 05–137,942A, Jun. 1993.*

* cited by examiner

Primary Examiner—Steven Bos
Assistant Examiner—Timothy C Vanoy
(74) Attorney, Agent, or Firm—John P. White; Cooper & Dunham LLP (57) ABSTRACT

A polluted fluid, such as exhaust gas from a refuse incinerator, containing at least one pollutant, such as volatile organic compounds (VOCs), SOx or NOx, is processed by passing the polluted fluid through an adsorbing layer containing a high-silica adsorbent capable of adsorbing both ozone and at least one pollutant to adsorb at least one pollutant on the adsorbent. Then, ozone is brought into contact with the adsorbing layer to oxidize and decompose the pollutant adsorbed on the adsorbent, while stopping the flow of the polluted fluid.

8 Claims, 4 Drawing Sheets

METHOD FOR PROCESSING POLLUTED FLUID CONTAINING POLLUTANTS

BACKGROUND OF THE INVENTION

The present invention relates to a method for processing a fluid containing a pollutant(s) (polluted fluid) to make the pollutants harmless, and more particularly to a method for processing a polluted fluid, suitable for making a pollutant present in a small amount in a large amount of fluid, or for making a specific pollutant present in the polluted fluid at a relatively low concentration coexisting with the other pollutants at a relatively high concentration.

An oxidizing treatment with ozone is known in the art as a method for processing a gas or water containing pollutants (polluted fluid). Ozone, which is self-decomposable and, thus, is unlikely to remain in the processed fluid so as to give detrimental effects to the human body, is expected to be used widely in future as a clean processing agent.

For performing treatment with ozone, an ozone-containing gas from an ozone generator (ozonizer) has been injected into a polluted fluid. However, the concentration of the pollutants in the polluted fluid is very low in general, with the result that a large proportion of ozone is decomposed before its contribution to the decomposition by oxidation of the pollutants. It follows that ozone fails to make the polluted fluid harmless at a high efficiency.

Recently, among various environmental pollutants contained in a polluted gas, dioxin becomes an issue of great concern, and it is desired to develop a method for effectively processing a polluted gas containing dioxin, such as an exhaust gas from a refuse incinerator. Dioxin can be decomposed by the oxidation with ozone. However, a large amount of the other harmful substances such as VOCs (volatile organic compounds), SOx and NOx are often contained in the exhaust gas from a refuse incinerator, in addition to dioxin and their total concentration amounts to 10 to 100 times the concentration of dioxin. Therefore, even if ozone is introduced into the dioxin-containing gas, ozone is consumed due to the reaction with the large amount of the other harmful substances, and can not contribute to the decomposition by the oxidation of dioxin.

Likewise, recently, the generation of malodor in various water systems such as a water-supply system or a sewage system, in particular, musty odor in a water purifying plant, due to 2-methylisoborneol (2-MIB) or diosmin mainly originating from microorganisms, also becomes an issue of great concern. Conventionally, a treatment with activated carbon is carried out to remove musty odor in these water system. However, the treatment with activated carbon is low in removal efficiency, must be renewed frequently, and is costly.

The malodorous components such as 2-MIB can be decomposed by the oxidation with ozone. However, the concentration of the malodorous components is very low in the water system, or a large amount of the other harmful substances such as COD (chemical oxygen demand) components are often contained in the water system, in addition to malodorous components, and their total concentration amounts to 10 to 100 times the concentration of malodorous component. Therefore, even if ozone is introduced into the malodorous component-containing water, ozone is decomposed due to contact with water, or consumed due to the reaction with a large amount of the other harmful substances such as COD components, and can not contribute to the decomposition by the oxidation of the malodorous components.

BRIEF SUMMARY OF THE INVENTION

It is therefore an object of the present invention to provide a method for processing a polluted fluid containing pollutants to efficiently make the pollutants harmless by the treatment with ozone.

It is another object of the invention to provide a method for processing a polluted fluid containing a specific pollutant together with a large amount of the other harmful substances or pollutants to preferentially decompose the specific pollutant and make it harmless by the treatment with ozone.

These and other objects which will be become apparent from the following description are achieved according to the present invention by a method for processing a polluted fluid containing at least one pollutant, comprising the steps of passing the polluted fluid through an adsorbing layer containing a high-silica adsorbent capable of adsorbing both ozone and at least one pollutant to adsorb at least one pollutant on the adsorbent; and bringing ozone into contact with the adsorbing layer to oxidize and decompose the pollutant adsorbed on the adsorbent, while stopping the flow of the polluted fluid.

According to the present invention, there is further provided a method for processing a polluted fluid containing at least one pollutant, comprising the steps of providing at least one processing chamber containing an adsorbing layer comprising a high-silica adsorbent capable of adsorbing ozone and at least one pollutant; and effecting, in the processing chamber, a processing cycle including an adsorption phase in which the polluted fluid is passed through the adsorbing layer to adsorb at least one pollutant on the adsorbent and the fluid having passed through the adsorbing layer is discharged from the processing chamber, and a decomposition phase in which ozone is brought into contact with the adsorbing layer which has adsorbed the pollutant to oxidize and decompose the pollutant adsorbed on the adsorbent, while stopping the flow of the polluted fluid. In this case there can be provided a plurality of processing chambers each filled with the high-silica adsorbent, and at least one processing chamber can be subjected to the adsorption phase, while the other processing chamber is subjected to the decomposition phase.

In the present invention, the polluted fluid may contain a plurality of pollutants at least one of which can be preferentially adsorbed by the high-silica adsorbent.

In the present invention, the high-silica adsorbent is preferably selected from the group consisting of a high-silica pentacile zeolite, a dealumination faujasite, a mesoporous silicate and a mixture thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

During research on the measure for processing a polluted fluid (gas or water) containing pollutants by means of ozone, the present inventors have found that when the polluted fluid is contacted with a high-silica adsorbent which is capable of adsorbing ozone and at least one pollutant, at least one pollutant is adsorbed (concentrated), and that the adsorbed pollutant(s) at high concentration can be effectively decomposed by contacting with ozone, greatly enhancing processing efficiency by ozone. Further, it has been found that as to a specific pollutant(s) found in a polluted gas, such as dioxin, or a specific pollutant(s) found in a polluted water, such as malodorous substances, the high-silica adsorbent selectively adsorbs them even they are present together with a large amount of the other pollutants, thereby allowing the decomposition by the oxidation with ozone of these specific pollutants to be effectively carried out in a concentrated state of these specific pollutants. The present invention is based on these findings.

According to the present invention, a polluted fluid (polluted gas or water) containing at least one pollutant is first passed through an adsorbing layer containing a high-silica adsorbent, thereby adsorbing at least one pollutant on the adsorbent, while discharging the fluid having passed through the adsorbing layer outside the system (adsorption phase). After the adsorption phase, the pollutant adsorbed on the adsorbent is contacted with ozone to decompose the adsorbed pollutant while stopping the flow of the polluted fluid (decomposition phase, or regeneration phase of the adsorbent). Thus, the adsorbing layer is subjected to a cycle comprising the adsorption phase and the decomposition phase.

The adsorbent used in the present invention is a high-silica adsorbent which has a high silica content and must adsorb not only ozone, but also at least one pollutant. Usually, the high-silica adsorbent is contained in a processing chamber as a layer (bed). The processing chamber has a polluted fluid inlet line, a discharge line for the fluid having passed through the adsorbing layer, an ozone inlet line, and an ozone-tread fluid discharge line.

The high-silica adsorbent used in the present invention includes, for example, high-silica pentacile zeolites (e.g., silicalite or ZSM-5 (commercially available from Mobil Oil Corp.) having a high $SiO_2/Al_2O_3$ ratio), dealumination faujasites (e.g., ultra stable Y-type zeolites (USYs)), and mesoporous silicates (e.g., MCM-41 (commercially available from Mobil Oil Corp.), FSM-16 (commercially available from Toyota Chuo Kenkyusho, Japan), low temperature acidically synthesized mesoporous silicates prepared by using tetraethoxy silane as a silica source, which are hereinafter referred to as "low temperature mesoporous silicates I", or low temperature acidically synthesized mesoporous silicate prepared by using a low molecular weight silicic acid as a silica source, which are hereinafter referred to as "low temperature mesoporous silicate II"). Any of these high-silica adsorbents is commercially available.

The high-silica pentacile zeolites have a $SiO_2/Al_2O_3$ ratio of about 10 to 100, and can be obtained by a hydrothermal synthesis at about 150 to 180° C., using sodium silicate or fumed silica as a silica source, aluminum sulfate as an aluminum source, and tetrapropylammonium bromide as an organic template.

The dealumination faujasites are ultra stable Y-type zeolites (USY) having a $SiO_2/Al_2O_3$ ratio of about 10 to 400, and can be obtained by treating a Na-Y type zeolite having a $SiO_2/Al_2O_3$ ratio of about 5 with ammonia water to remove a major portion of Al included in the zeolite skeleton.

The mesoporous silicates are silica-based porous body having meso-pores of 10 to 1,000 angstroms, and can be prepared by various methods. By controlling the manufacturing conditions, a $SiO_2/Al_2O_3$ ratio of the mesoporous silicates can be varied over a wide range, e.g., from those having a $SiO_2/Al_2O_3$ ratio of about 10 to those substantially consisting of $SiO_2$ alone. For example, MCM-41 is a silica-based porous body having a specific surface area of about 1600 $m^2/g$ and a $SiO_2/Al_2O_3$ ratio of about 1000, and can be obtained by a method developed by Mobil Oil Corp. (see U.S. Pat. Nos. 5,378,440; 5,364,797; and 5,348,687, as well as C. T. Kresge, M. E. Leonowiez, W. J. Roth, J. C. Vartuli and J. S. Beck, Nature, 359, 710 (1992)). Specifically, the reaction may be carried out at 140° C. under a pH of 13.5 among water glass or sodium silicate used as a silica source, aluminum sulfate as an aluminum source and a cationic surfactant (having at least 8 carbon atoms) used as an organic template so as to obtain MCM-41. FMS-16 is a silica-based porous body having a chemical structure similar to that of MCM-41 and having a $SiO_2/Al_2O_3$ ratio of about 1000. The material can be prepared by intercallation between kanemite developed by Kuroda, Inagaki, et al. (see JP 8067578, and S. Inagaki, Y. Fukushima and K. Kuroda, J. Chem. Soc., Chem. Commun., 680 (1993)) and a cationic surfactant. The low temperature mesoporous silicates I can be synthesized by a method proposed by Stucky et al. (see Q. Huo, D. I. Margolese, U. Ciesla, D. G. Demuth, P. Peng, T. E. Gier, P. Siger, A. Firouzi, B. F. Chmelka, F. Schuth and G. D. Stucky, Chem. Mater., 6, 1176 (1994). Specifically, the material can be obtained by the reaction at room temperature and a pH of 1 or less among tetraethoxy silane (TEOS) used as a silica source, aluminum sulfate as an aluminum source and a cationic surfactant used as an organic template. Further, the low temperature mesoporous silicates II can be prepared by a method described in Y. M. Setoguchi, Y. Teraoka, I. Moriguchi, S. Kagawa, N. Tomonaga, A. Yasutake, and J. Izumi, Journal of Porous Materials, 4, 129–134 (1997). Specifically the material can be prepared by the reaction at room temperature and a pH of 1 or less among silicic acid, which does not contain a polycondensed silica and is used as a silica source, aluminum sulfate used as an aluminum source and a cationic surfactant used as an organic template. By controlling the reaction conditions, a $SiO_2/Al_2O_3$ ratio of the mesoporous silicate can be varied over a wide range, from those having a $SiO_2/Al_2O_3$ ratio of about 10 to those substantially consisting of $SiO_2$ alone.

The present inventors have experimentally found that, among the high-silica adsorbents, high-silica pentacile zeolites having a $SiO_2/Al_2O_3$ ratio of 70 or more, dealumination faujasites having a $SiO_2/Al_2O_3$ ratio of 20 or more and mesoporous silicates having a $SiO_2/Al_2O_3$ ratio of 20 or more exhibit a high adsorbing capability for ozone and dioxin or malodorous components in the polluted fluid, suppress decomposition of the adsorbed ozone and, thus, can be used as preferred adsorbents. Among these preferred adsorbents, the high-silica pentacile zeolites, which certainly exhibit a high ozone adsorbing capability, tend to be somewhat high in the ozone decomposition rate. In view of both the ozone adsorption capability and the ozone decomposition rate, mesoporous silicates having a $SiO_2/Al_2O_3$ ratio of 20 or more provide the most satisfactory adsorbent. Then, dealumination faujasites having a $SiO_2/Al_2O_3$ ratio of 20 or more and high-silica pentacile zeolites having a $SiO_2/Al_2O_3$ ratio of 70 or more follow the mesoporous silicates in the order mentioned.

These adsorbents can be used singly or in the form of a mixture and can be formed into an optional shape, i.e., can be shaped like grains, pellets, Raschig rings, honeycombs, etc., depending on the purpose of the use. The adsorbing layer may be of a double layer structure comprising a first adsorbent layer arranged on the upstream side and containing a mesoporous silicate which is capable efficiently adsorbing a high concentration ozone, and a second adsorbent layer arranged on the downstream side and containing a dealumination faujasite which is capable of efficiently adsorbing a low concentration ozone. The adsorbing layer of the particular double layer structure permits improving the efficiency of utilizing ozone.

When the polluted fluid is introduced into the adsorbing layer containing the high-silica adsorbent, at least one pollutant is adsorbed by the adsorbing layer, and is concentrated in the adsorbing layer. The temperature at which the adsorption phase is carried out is preferably 15 to 100° C., more preferably 25 to 50° C. in the case where the polluted fluid is in the form of a polluted gas, while it is preferably 15 to 50° C., more preferably 25 to 35° C. in the case where the polluted fluid is in the form of a polluted water.

After the adsorption phase is finished, the introduction of the polluted fluid into the adsorbing layer is terminated, and the adsorption phase is switched to the decomposition phase. This switching of the adsorption phase to the decomposition phase can be determined based on the concentration of the pollutants measured by a sensor placed at the inlet of the processing chamber or in the adsorbing layer. However, if the properties of the polluted fluid is known previously, and the concentration of the pollutants does not change significantly, the duration period for the adsorption phase can be set beforehand, and the switching can be made after the set period of time. Further, if the adsorption phase is terminated with some downstream portion of the adsorbing layer remaining in an unadsorbed state, the leakage of ozone into the outlet gas from the adsorbing layer can be substantially completely suppressed throughout the entire processing cycle.

In the decomposition phase, the adsorbing layer having adsorbed the pollutants is contacted with ozone. The ozone used can be generated by various ozone generators (ozonizers) known per se in the art. An ozonizer of any of a silent discharge system, an ultraviolet light lamp system, and a water electrolyzing system can be used in the present invention for generating ozone. In the water electrolyzing system, an ion exchange membrane subjected to a special treatment is interposed between a gas permeable electrode (hydrogen electrode) consisting of carbon and fluororesin and a lead dioxide electrode (ozone electrode), as is known in the art. An ion exchanged water supplied as a raw material water to the ozone electrode is electrolyzed so as to generate ozone and oxygen on the ozone electrode and hydrogen on the hydrogen electrode. Since a clean ozone gas can be obtained at a high concentration, the ozonizer of the water hydrolyzing system is particularly suitable for use in processing the polluted fluid according to the present invention.

In the case where the polluted fluid is a polluted gas, it is preferred that the ozone is passed into the adsorbing layer as an ozone-containing gas from the ozone generator.

On the other hand, in the case where the polluted fluid is a polluted water, it is preferred that the ozone is passed into the adsorbing layer as an ozone-containing water, with the polluted water still remaining in the processing chamber. However, an ozone-containing gas from the ozone generator may be passed into the adsorbing layer after the polluted water is removed from the processing chamber, or an ozone-containing gas from the ozone generator is bubbled into the adsorbing layer with the polluted water still remaining in the processing chamber.

The amount of ozone can generally be 1 to 100 moles per mole of pollutant. In the case where the polluted fluid is a polluted gas, the ozone is preferably used in an amount of about 1 to 20 moles, more preferably about 3 to 10 moles, per mole of the pollutant. In the case where the polluted fluid is a polluted water, the ozone is preferably used in an amount of about 1 to 100 moles, more preferably about 1.5 to 10 moles, per mole of the pollutant. The concentrations of the pollutants in the polluted fluid can be measured easily by a method known per se, such gas chromatography.

The decomposition phase can generally be carried out at a temperature of 15 to 100° C. In the case where the polluted fluid is a polluted gas, the decomposition phase is preferably carried out at a temperature of 15 to 100° C., more preferably 25 to 50° C. On the other hand, in the case where the polluted fluid is a polluted water, the decomposition phase is preferably carried out at a temperature of 15 to 50° C., more preferably 25 to 35° C.

The decomposition reaction rate of the pollutants with ozone is proportional to the product $[O_3]\cdot[D]$ of the ozone concentration $[O_3]$ and the pollutant concentration $[D]$ both on the adsorbent surfaces. In the present invention, the pollutants are adsorbed on the high-silica adsorbent at a concentration significantly higher than that in the polluted fluid, and also the ozone is adsorbed on high-silica adsorbent at a concentration significantly higher than that in the ozone-containing gas or ozone-containing water. It follows that the decomposition reaction rate of the pollutants with ozone becomes much more higher on the adsorbent, with the results that the pollutants can be efficiently removed or decomposed, and the ozone can be utilized efficiently.

In the present invention, an ozone-decomposing layer containing an ozone-decomposing agent such as activated carbon or alumina-based substance can be provided on the adsorbing layer at the downstream side in view of the ozone introduction direction in order to completely suppress the leakage of the ozone from the adsorbing layer. Further, in the present invention, the direction in which the ozone is introduced into the adsorbing layer is not particularly limited. However, in order to suppress the leakage of the ozone from the adsorbing layer as completely as possible, the ozone is preferably introduced into the adsorbing layer in a direction opposite to the direction in which the polluted fluid is introduced into the adsorbing layer.

The method of the present invention can be carried out using a plurality of processing chambers each containing an adsorbing layer comprising the high-silica adsorbent. In each of the processing chamber, a processing cycle including the adsorption phase and the decomposition phase as noted above is carried out. In such a case, the processing of the polluted fluid can be continuously carried out by subjecting at least one processing chamber to the adsorption phase, while subjecting the other processing chamber or chambers to the decomposition phase. Usually, since the decomposition phase can be completed in a shorter period of time than the adsorption phase, during time period after the decomposition phase has been finished and before the decomposition phase is switched to the decomposition phase, the processing chamber may be in a waiting state, with the introduction of the polluted fluid being stopped. Further, where 3 or more processing chambers are used, the number of the processing chambers subjecting to the adsorption phase may be more than the number of the processing chambers subjecting to the decomposition phase.

In the present invention, the polluted fluid may contain 2 or more kinds of pollutants, and in such a case, a specific kind or kinds of pollutants may be preferentially adsorbed on the high-silica adsorbent. Such a specific pollutant may include dioxin or malodorous components. Where a polluted fluid containing such a specific pollutant is processed, the fluid passing through the adsorbing layer may contain the other pollutants. In such a case, said fluid may be separately subjected to a processing treatment conventionally known per se in the art to make the other pollutants harmless. Such a conventional treatment may include an adsorption with activated carbon. In the present invention, where a polluted gas containing a small amount of specific pollutant such as dioxin together with a large amount of the other pollutant such as VOCs is processed, or a polluted water containing a small amount of specific pollutant such as malodorous component together with a large amount of the other pollutants such as COD components is processed, the specific pollutant(s) can be preferentially removed and decomposed.

Next, the present invention will be explained below with reference to the drawings.

Figures 1, 2:
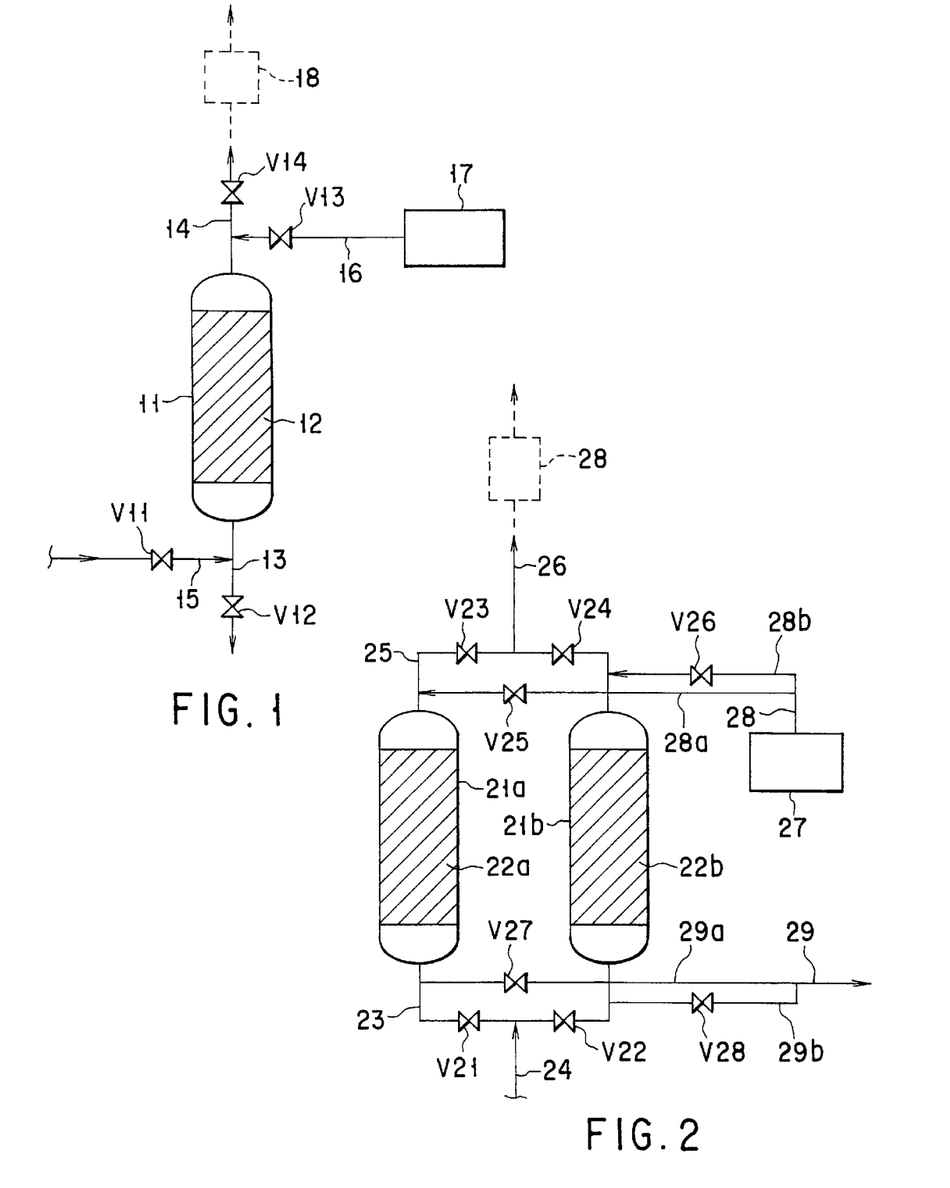
FIG. 1 is a block diagram illustrating an apparatus suitable for use in processing a polluted gas according to the present invention.
FIG. 2 is a block diagram illustrating another apparatus suitable for use in processing a polluted gas according to the present invention.

FIG. 1 is a block diagram illustrating an apparatus suitable for use in processing a polluted gas according to the present invention. The apparatus shown in FIG. 1 has a processing chamber 11, which contains an adsorbing layer 12 consisting of the high-silica adsorbent described above. A first conduit 13 is connected to the bottom of the processing chamber 11, while a second conduit 14 is connected to the top of the processing chamber 11. A polluted gas conduit 15 is connected to the first conduit 13 provided with a valve V11. A valve V12 is provided in the first conduit 13 at a position below the connection of the conduit 15 with the conduit 13. On the other hand, an ozone conduit 16 connected to an ozone generator 17 and having a valve V13 is connected to the second conduit 14. A valve V14 is provided in the second conduit 14 at a position above the connection of the conduit 14 with the conduit 16.

In the adsorption phase, the valves V12 and V13 are closed, and the valves V11 and V14 are opened. Then, a polluted gas is introduced into the processing chamber 11 through the conduits 15 and 13. If the content of the gas having passed through the adsorbing layer 12 and discharged from the second conduit 14 is at an acceptable level, the gas can be released into the atmosphere. If the polluted gas contains a specific pollutant as noted above together with the other pollutants, the other pollutants sometimes may not be adsorbed or removed even when the content of the specific pollutant in the fluid subjected to the adsorption is at an acceptable level. In such a case, the fluid discharged from the conduit 14 is further treated with a conventional processing device 18 to remove the other pollutants. The device 18 may be the one which utilizes the adsorption by activated carbon as described earlier.

When the adsorbed amount of the pollutants increases and the content of the pollutants in the fluid subjected to the adsorption treatment exceeds an acceptable level, the valves V11 and V14 are closed to stop the flow of the polluted gas. Then, the valves V12 and V13 are opened to introduce an ozone-containing gas from the ozone generator into the processing chamber in order to start the decomposition phase. The introduced ozone is adsorbed in the adsorbing layer 12, and oxidizes and decomposes the pollutants adsorbed and concentrated on the high-silica adsorbent constituting the adsorbing layer 12. Usually, the ozone-treated fluid exhausting from the valve V12 does not contain the pollutants and ozone, or contains them at a very low concentration, and thus can be released into the atmosphere. However, an ozone-decomposing layer (not shown) as noted above can be provided on the downstream side of the adsorbing layer in view of the flow of the ozone, if necessary.

In the embodiment described above with reference to FIG. 1, the switching from the adsorption phase to the decomposition phase is based on the analysis of the pollutants contained in the fluid subjected to the adsorption phase. If the properties of the polluted fluid is known previously, and the concentration of the pollutants does not change significantly, the duration period for the adsorption phase can be set beforehand, and the switching can be made after the set period of time. Further, if the adsorption phase is terminated with some downstream portion of the adsorbing layer remaining in an unadsorbed state, the leakage of ozone into the outlet gas from the adsorbing layer can be substantially completely suppressed throughout the entire processing cycle.

FIG. 2 is a block diagram illustrating another apparatus suitable for use in processing a polluted gas according to the present invention. This apparatus has two processing chambers 21a and 21b, which contain adsorbing layers 22a and 22b, respectively. The adsorbing layers 22a and 22b are each constituted by the high-silica adsorbent described above. A first common conduit 23 provided with valves V21 and V22 is connected to the bottoms of the processing chambers 21a and 21b. A polluted gas conduit 24 is connected to the common conduit 23 between the valves V21 and V22. On the other hand, a second common conduit 25 provided with valves V23 and V24 is connected to the tops of the processing chambers 21a and 21b. A conduit 26 for the fluid subjected to the adsorption phase is connected to the second common conduit 25 between the valves V23 and V24.

An ozone conduit 28 from an ozone generator 27 is branched into branch conduits 28a and 28b. The branch conduit 28a is provided with a valve V25, and is connected to the second conduit 25 between the processing chamber 21a and the valve V23, while the branch conduit 28b is provided with a valve V26, and is connected to the second conduit 25 between the processing chamber 21b and the valve V24. An ozonetreated gas conduit 29a provided with a valve V27 is connected to the first common conduit 23 between the processing chamber 21a and the valve V21, while another ozone-treated gas conduit 29b provided with a valve V28 is connected to the first common conduit 23 between the processing chamber 21b and the valve V22. The conduits 29a and 29b combines into one exhaust conduit 29.

The apparatus shown in FIG. 2 is operated such that while one processing chamber 21a is subjected to the adsorption phase, the other processing chamber 21b is subjected to the decomposition phase.

First, the valves V22, V24, V25 and V27 are closed, and the valves V21 and V23 are opened. A polluted gas is introduced from the conduit 24 into the processing chamber 21a through the valve 21, passes through the adsorbing layer 22a where the pollutants are adsorbed, and then exhausted, as a adsorption-treated gas whose pollutant concentration is at acceptable level, from the conduit 26 through the valve V23. The exhausted gas is further treated in a processing device 28 similar to the device 18 of FIG. 1, if necessary, and is released into the atmosphere.

When the adsorbed amount of the pollutants increases and the content of the pollutants in the fluid subjected to the adsorption treatment exceeds an acceptable level, the valves V21 and V23 are closed to stop the flow of the polluted gas into the processing chamber 21a. Then, the valves V22 and V24 are opened to introduce the polluted gas into the processing chamber 21b in order to subject the processing chamber 21b to the adsorption phase. While subjecting the processing chamber 21b to the adsorption phase, the valves V25 and V27 are opened to introduce an ozone-containing gas from the ozone generator into the processing chamber 21a, in order to start the decomposition phase. During this period, the valves V26 and V28 are closed. The ozone introduced into the adsorbing layer 22a oxidizes and decomposes the pollutants adsorbed and concentrated on the high-silica adsorbent constituting the adsorbing layer 22a. Usually, the ozone-treated fluid exhausting through the conduits 29a and 29 does not contain the pollutants and ozone, or contains them at a very low concentration, and thus can be released into the atmosphere. However, an ozone-decomposing layer (not shown) as noted above can be provided on the downstream side of the adsorbing layer in view of the flow of the ozone, if necessary.

As has been described above, the polluted gas can be continuously processed by alternately subjecting the processing chambers 21a and 21b to the adsorption phase and the decomposition phase. Usually, since the decomposition phase can be completed in a shorter period of time than the adsorption phase, during time period after the decomposition phase has been finished and before the decomposition phase is switched to the decomposition phase, the processing chamber may be in a waiting state, with the introduction of the polluted fluid being stopped.

Figure 3:
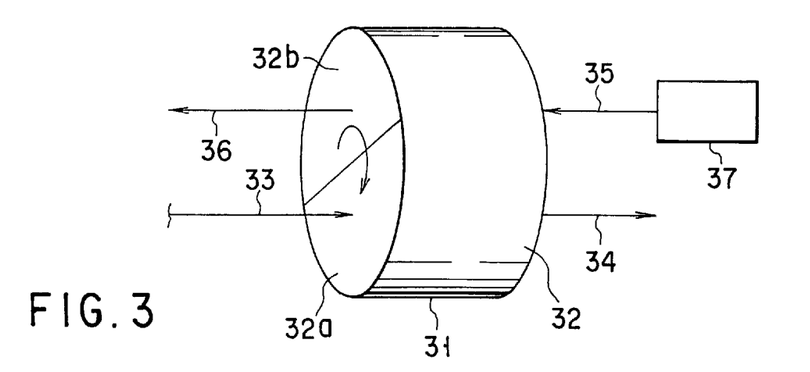
FIG. 3 is a block diagram illustrating a still another apparatus suitable for use in processing a polluted gas according to the present invention.

FIG. 3 is a block diagram illustrating a still another apparatus suitable for use in processing a polluted gas according to the present invention. The apparatus of FIG. 3 has a cylindrical chamber 31 capable of rotating about the central axis, and containing an adsorbing layer 32 constituted by the high-silica adsorbent of the invention. The adsorbing layer 32 within the chamber 21 is sectioned into two zones 32a and 32b. The rotatable chamber is provided with a polluted gas conduit 33 for introducing a polluted gas into one zone 32a subjected to the adsorption phase and with an adsorption-treated gas conduit 34 for exhausting, from the chamber 31, the fluid having passed through the zone 32a. Further, the chamber is provided with an ozone conduit 35 for introducing an ozone-containing gas from an ozone generator into the other zone 32b subjected to the adsorption phase while the zone 32a is subjected to the adsorption zone, and with an ozone-treated gas conduit 36 for exhausting, from the chamber 31, the fluid having passed through the zone 32b. The conduits 33 and 34 are stationary or fixed conduits, and the conduits 35 and 36 are also fixed conduits. These conduits can be arranged by means known per se in the art such as swivel joints or rotary switching valves.

The zones 32a and 32b are alternately subjected to the adsorption phase and the decomposition phase. The polluted gas introduced from the conduit 33 into the zone at the adsorption phase is removed of the pollutants by adsorption, and is exhausted from the chamber as a gas having a pollutant concentration at an acceptable lever through the conduit 34. The exhausted gas is further treated in a processing device similar to the device 18 or 28 of FIG. 1 or 2, if necessary, and is released into the atmosphere.

The zone which has adsorbed the pollutants during the adsorption phase is transferred to the decomposition phase by the rotation of the chamber 31, and an ozone-containing gas from the ozone generator 37 is introduced thereinto. The introduced ozone is adsorbed in the adsorbing layer 12, and oxidizes and decomposes the pollutants adsorbed and concentrated on the high-silica adsorbent constituting the adsorbing layer 32. Usually, the ozone-treated fluid exhausting from the conduit 36 does not contain the pollutants and ozone, or contains them at a very low concentration, and thus can be released into the atmosphere. However, an ozone-decomposing layer (not shown) as noted above can be provided on the downstream side of the adsorbing layer in view of the flow of the ozone, if necessary.

Further, in the embodiment described with reference to FIG. 3, the adsorbing layer 32 is equally sectioned into two zones. However, the volume of the zones can be set as desired in view of, for example, the time required for the adsorption phase and the decomposition phase. Moreover, an intermediate zone into and from which no gas flows can be set between the zones in order to clearly distinguish the processing zones.

Figure 4:
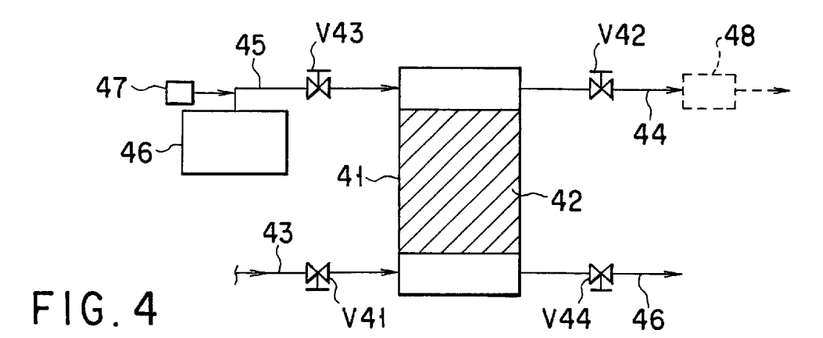
FIG. 4 is a block diagram illustrating an apparatus suitable for use in processing a polluted water according to the present invention.

FIG. 4 is a block diagram illustrating an apparatus suitable for use in processing a polluted water according to the present invention.

The apparatus shown in FIG. 4 has one processing chamber 41, which contains an adsorbing layer 42 constituted by the high-silica adsorbent described above. A polluted water conduit 43 is connected to the bottom of the processing chamber 41, while an adsorption-treated water conduit 44 is connected to the top of the processing chamber 41. The conduit 43 is provided with a valve 41, while the conduit 44 is provided with a valve 42.

Further, an ozone-containing water conduit 45 is connected to the top of the processing chamber 41, for introducing an ozone-containing gas from an ozone generator 46 and water from a water source 47 into the processing chamber 41 as an ozone-containing water. On the other hand, an ozone-treated water conduit 46 is connected to the bottom of the processing chamber 41 for exhausting the water from the processing chamber. The conduit 46 is provided with a valve V43, while the conduit 46 is provided with a valve V44.

In the adsorption phase, the valves V43 and V44 are closed, and the valves V41 and V42 are opened. Then, a polluted water is introduced into the processing chamber 41 through the conduit 43. If the content of the water having passed through the adsorbing layer 42 and discharged from the conduit 44 is at an acceptable level, the water can be released as an effluent or utilized for supply-water. If the polluted water contains a specific pollutant as noted above together with the other pollutants, the other pollutants sometimes may not be adsorbed or removed even when the content of the specific pollutant in the water subjected to the adsorption is at an acceptable level. In such a case, the water discharged from the conduit 44 is further treated with a conventional processing device 48 to remove the other pollutants. The device 48 may be the one which utilizes the adsorption by activated carbon as described earlier.

When the adsorbed amount of the pollutants increases and the content of the pollutants or malodor in the water subjected to the adsorption treatment exceeds an acceptable level, the valves V41 and V42 are closed to stop the flow of the polluted water. Then, the valves V43 and V44 are opened to introduce an ozone-containing water through the conduit 45 into the processing chamber 41 in order to start the decomposition phase. The introduced ozone is adsorbed in the adsorbing layer 12, and oxidizes and decomposes the pollutants adsorbed and concentrated on the high-silica adsorbent constituting the adsorbing layer 42. Usually, the ozone-treated water exhausting from the conduit 46 does not contain the pollutants and ozone, or contains them at a very low concentration, and thus can be released as an effluent. However, an ozone-decomposing layer (not shown) as noted above can be provided on the downstream side of the adsorbing layer in view of the flow of the ozone, if necessary.

In the embodiment described above with reference to FIG. 1, the switching from the adsorption phase to the decomposition phase is based on the analysis of the pollutants or malodor contained in the fluid subjected to the adsorption phase. If, however, the properties of the polluted water is known previously, and the concentration of the pollutants does not change significantly, the duration period for the adsorption phase can be set beforehand, and the switching can be made after the set period of time. Further, if the adsorption phase is terminated with some downstream portion of the adsorbing layer remaining in an unadsorbed state, the leakage of ozone into the outlet gas from the adsorbing layer can be substantially completely suppressed throughout the entire processing cycle.

Figure 5:
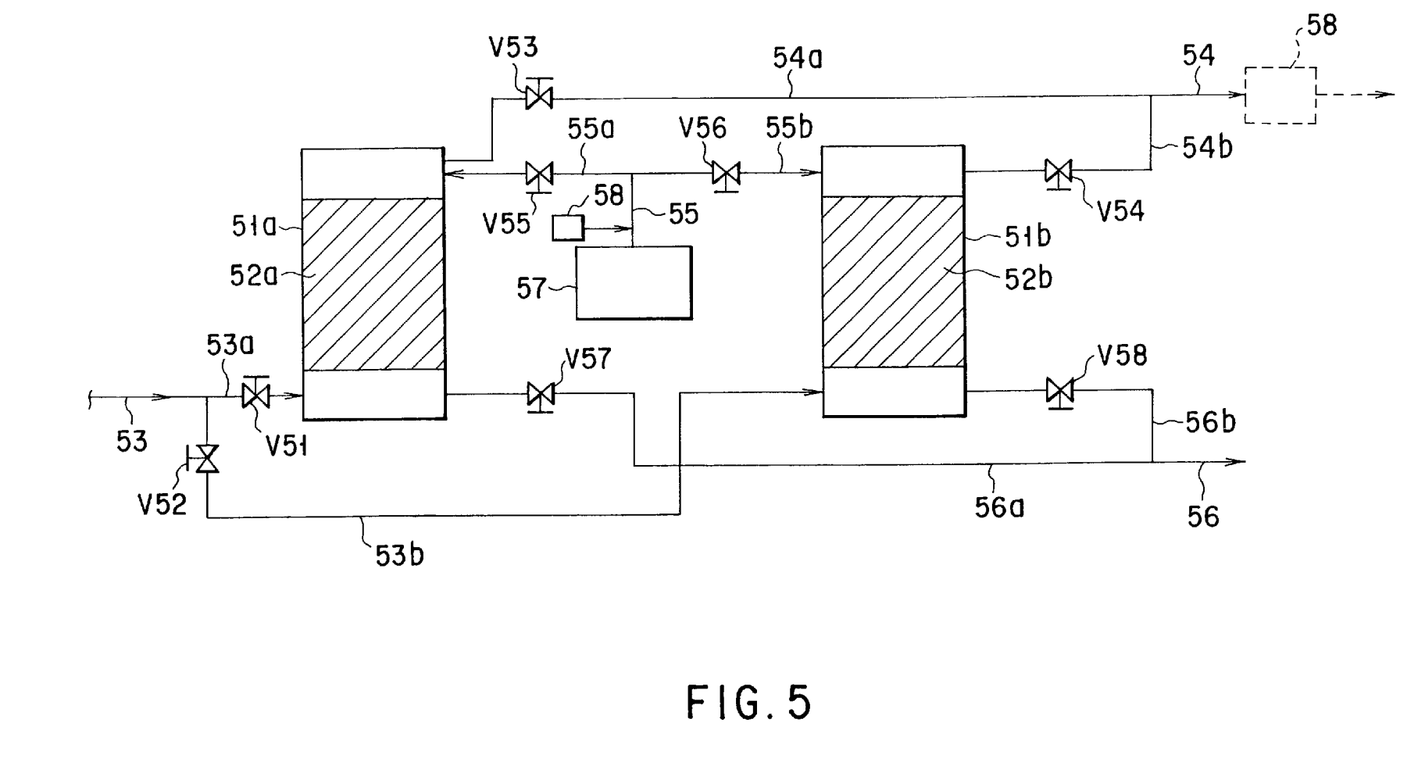
FIG. 5 is a block diagram illustrating another apparatus suitable for use in processing a polluted water according to the present invention.

FIG. 5 is a block diagram illustrating another apparatus suitable for use in processing a polluted water according to the present invention. This apparatus has two processing chambers 51a and 51b, which contain adsorbing layers 52a and 52b, respectively. The adsorbing layers 52a and 52b are each constituted by the high-silica adsorbent described above. A polluted water conduit 53 is branched into two branch conduits 53a and 53b. The branch conduit 53a is provided with a valve V51 and is connected to the bottom of the processing chamber 51a, while the branch conduit 53b is provided with a valve V52 and is connected to the bottom of the other processing chamber 51b. An adsorption-treated water conduit 54a provided with a valve V53 is connected to the top of the processing chamber 51a, while another adsorption-treated water conduit 54b provided with a valve V54 is connected to the top of the processing chamber 51b. The conduits 54a and 54b combines into one exhaust conduit 54.

An ozone-containing water conduit 55 for supplying an ozone-containing gas from an ozone generator 57 and water from a water source 58 together as an ozone-containing water is branched into branch conduit 55a and 55b. The branch conduit 55a is provided with a valve V55 and is connected to the upper portion of the processing chamber 51a, while the branch conduit 55b is provided with a valve V56 and is connected to the upper portion of the processing chamber 51b. An ozone-treated water conduit 56a provided with a valve V57 is connected to the bottom of the processing chamber 51a, while another ozone-treated water conduit 56b provided with a valve V58 is connected to the bottom of the processing chamber 51b. The conduits 56a and 56b combines into one exhaust conduit 56.

The apparatus shown in FIG. 5 is operated such that while one processing chamber 51a is subjected to the adsorption phase, the other processing chamber 51b is subjected to the decomposition phase, as the apparatus of FIG. 2.

First, the valves V52, V54, V55, V56 and V57 are closed, and the valves V11 and V53 are opened. A polluted water is introduced from the conduit 53 into the processing chamber 51a through the conduit 53a, passes through the adsorbing layer 52a where the pollutants are adsorbed, and then exhausted, as a adsorption-treated water whose pollutant concentration is at acceptable level, from the conduit 26 through the valve V23. The exhausted water is further treated in a processing device 58 similar to the device 18 or 28 of FIG. 1 or 2, if necessary, and is released as an effluent.

When the adsorbed amount of the pollutants increases and the content of the pollutants or malodor in the fluid subjected to the adsorption treatment exceeds an acceptable level, the valves V51 and V53 are closed to stop the flow of the polluted water into the processing chamber 51a. Then, the valves V52 and V54 are opened to introduce the polluted gas into the processing chamber 51b in order to subject the processing chamber 51b to the adsorption phase. While subjecting the processing chamber 51b to the adsorption phase, the valves V55 and V57 are opened to introduce an ozone-containing water from the conduit 55, in order to start the decomposition phase. The ozone introduced into the adsorbing layer 52a oxidizes and decomposes the pollutants adsorbed and concentrated on the high-silica adsorbent constituting the adsorbing layer 52a. Usually, the ozone-treated water exhausting through the conduits 56a and 56 does not contain the pollutants and ozone, or contains them at a very low concentration, and thus can be released as an effluent. However, an ozone-decomposing layer (not shown) as noted above can be provided on the downstream side of the adsorbing layer in view of the flow of the ozone, if necessary.

As has been described above, the polluted water can be continuously processed by alternately subjecting the processing chambers 51a and 51b to the adsorption phase and the decomposition phase. Usually, since the decomposition phase can be completed in a shorter period of time than the adsorption phase, during time period after the decomposition phase has been finished and before the decomposition phase is switched to the decomposition phase, the processing chamber may be in a waiting state, with the introduction of the polluted fluid being stopped.

Figure 6:
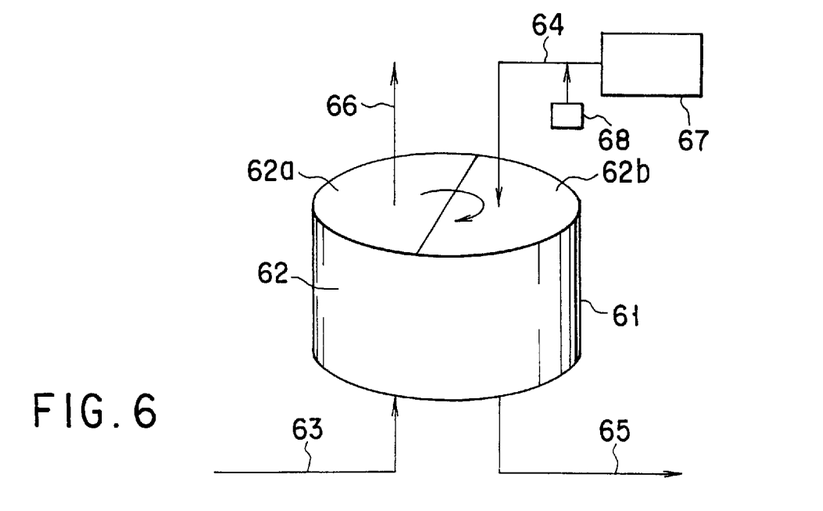
FIG. 6 is a block diagram illustrating a still another apparatus suitable for use in processing a polluted water according to the present invention.

FIG. 6 is a block diagram illustrating a still another apparatus suitable for use in processing a polluted water according to the present invention. The apparatus of FIG. 6 has a similar construction to the apparatus of FIG. 3. The apparatus of FIG. 6 a cylindrical chamber 61 capable of rotating about its central axis, and containing an adsorbing layer 62 constituted by the high-silica adsorbent of the invention. The adsorbing layer 62 within the chamber 61 is sectioned into two zones 62a and 62b. The rotatable chamber is provided with a polluted water conduit 63 for introducing a polluted water into one zone 62a subjected to the adsorption phase and with an adsorption-treated water conduit 64 for exhausting, from the chamber 61, the water having passed through the zone 62a. Further, the chamber 61 is provided with an ozone conduit 65 for introducing an ozone-containing gas from an ozone generator 67 and water from a water source 68 together as an ozone-containing water into the other zone 62b subjected to the adsorption phase while the zone 62a is subjected to the adsorption zone, and with an ozone-treated water conduit 56 for exhausting, from the chamber 61, the water having passed through the zone 62b. The conduits 63 and 64 are stationary or fixed conduits, and the conduits 65 and 66 are also fixed conduits. These conduits can be arranged by means known per se in the art such as swivel joints or rotary switching valves.

The zones 62a and 62b are alternately subjected to the adsorption phase and the decomposition phase. The polluted gas introduced from the conduit 63 into the zone at the adsorption phase is removed of the pollutants by adsorption, and is exhausted from the chamber as a water having a pollutant concentration at an acceptable lever through the conduit 34. The exhausted water is further treated in a processing device similar to the device 48 or 58 or of FIG. 4 or 5, if necessary, and is released as an effluent.

The zone which has adsorbed the pollutants during the adsorption phase is transferred to the decomposition phase by the rotation of the chamber 61, and an ozone-containing water from the ozone generator 37 is introduced thereinto. The introduced ozone is adsorbed in the adsorbing layer 62, and oxidizes and decomposes the pollutants adsorbed and concentrated on the high-silica adsorbent constituting the adsorbing layer 62. Usually, the ozone-treated water exhausting from the conduit 66 does not contain the pollutants and ozone, or contains them at a very low concentration, and thus can be released into the atmosphere. However, an ozone-decomposing layer (not shown) as noted above can be provided on the downstream side of the adsorbing layer in view of the flow of the ozone-containing water, if necessary.

Further, in the embodiment described with reference to FIG. 6, the adsorbing layer 62 is equally sectioned into two zones. However, the volume of the zones can be set as desired in view of, for example, the time required for the adsorption phase and the decomposition phase. Moreover, an intermediate zone into and from which no water flows can be set between the zones in order to clearly distinguish the processing zones.

The present invention will now be described more in detail with reference to Examples.

EXAMPLE 1

The air containing 100 ppm of isopropyl alcohol (IPA) which was used as a pseudo waste gas of a printing factory, was processed by a processing apparatus of the construction shown in FIG. 1 which was operated as described above. The processing chamber 11 was a cylindrical chamber having a diameter of 70 cm and a height of 150 cm, and was filled with 2 m$^3$ of mesoporous silicate (SiO$_2$/Al$_2$O$_3$=1000), dealumination faujasite (SiO$_2$/Al$_2$O$_3$=70), high-silica pentacile zeolite (SiO$_2$/Al$_2$O$_3$=40), or a commercially available silica gel. The pseudo waste gas was introduced into the processing chamber at a superficial velocity of 2 m/sec while the adsorption temperature was set at 25 ° C. The concentration of the IPA in the exhaust gas was always measured by IPA concentration sensor provided at the outlet of the processing chamber. When the sensor indicated a value of 1 ppm (acceptable level), the flow of the pseudo waste gas was stopped, thus terminating the adsorption phase. The time period from the start of the introduction of the pseudo waste gas to the indication of 1 ppm by the IPA sensor (hereinafter referred to as adsorbable period) was about 2 hours to the mesoporous silicate, about 1.5 hours for the dealumination faujasite, about 1.2 hours for the high-silica pentacile zeolite, and about 0.5 hours for the silica gel.

Then, the adsorption phase was switched to the decomposition phase. The processing chamber was maintained at 25 ° C., and an ozone-containing gas consisting of 20% of O$_3$, 76% of O$_2$ and 4% of H$_2$O and generated from a water electrolysis ozone generator was introduced at a superficial velocity of 0.01 m/sec into the processing chamber in a direction opposite to the waste gas flow to oxidize and decompose the adsorbed IPA. The concentrations at the outlet of the processing chamber of IPA and ozone were measured.

From the adsorbable period noted above, it is assumed that the adsorbed amount of IPA is in the order of mesoporous silicate>dealumination faujasite>high-silica pentacile zeolite>silica gel. Further, it was found that the leakage of the ozone begun about 1 hour after the start of the decomposition phase for the mesoporous silicate, the dealumination faujasite and the high-silica pentacile zeolite. Thus, it is assumed that the IPA adsorbed on the high-silica adsorbents was decomposed by ozone during that period of time. However, the leakage of ozone was begun about 0.2 hours after the start of the decomposition phase for the silica gel.

EXAMPLE 2

A water containing 5 ppm of ethanol as a COD component was used as a pseudo waste water. The pseudo waste water was processed by a processing apparatus of the construction shown in FIG. 4 which was operated as described above. The processing chamber 41 was a cylindrical chamber having a diameter of 30 cm and a height of 30 cm, and was filled with 80 liters of mesoporous silicate (SiO$_2$/Al$_2$O$_3$=1000), dealumination faujasite (SiO$_2$/Al$_2$O$_3$=70), high-silica pentacile zeolite (SiO$_2$/Al$_2$O$_3$=40), or a commercially available silica gel. The pseudo waste water was introduced into the processing chamber at a superficial velocity of 45 m/sec while the adsorption temperature was set at 25 ° C. The concentration of ethanol in the exhaust water was measured at the outlet of the processing chamber. When the ethanol concentration became 1 ppm (acceptable level), the flow of the pseudo waste water was stopped, thus terminating the adsorption phase. The adsorbable period was about 2 hours for the mesoporous silicate, about 1.5 hours for the dealumination faujasite, about 1.2 hours for the high-silica pentacile zeolite, and about 0.5 hours for the silica gel.

Figure 7:
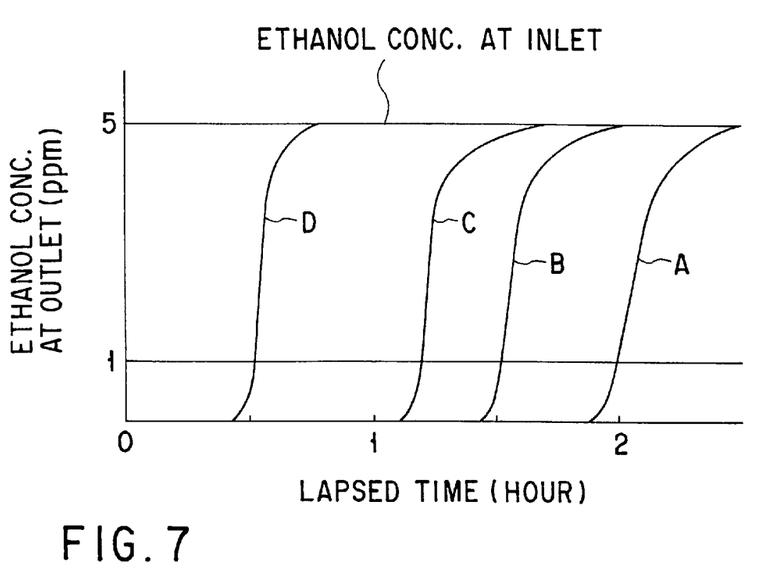
FIG. 7 is a graph showing the ethanol concentration change with time at the outlet of the adsorbing layer during the adsorption phase in Example 2 of the present invention which will be described later.
Figure 8:
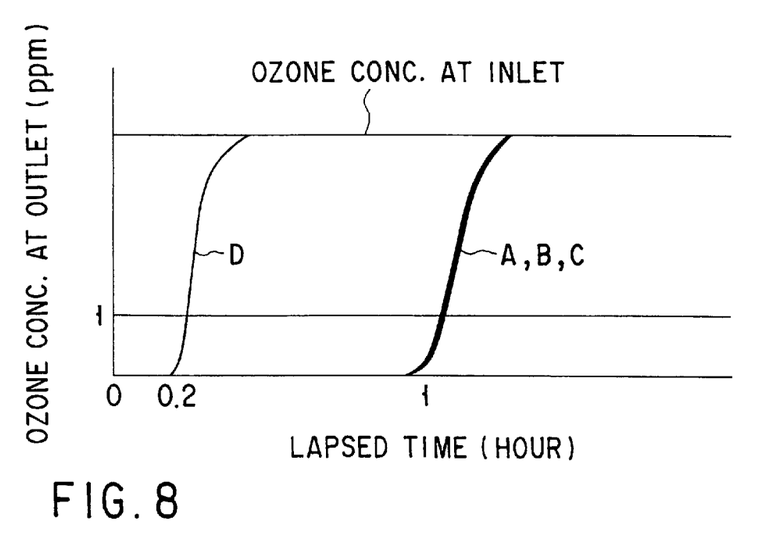
FIG. 8 is a graph showing the ozone concentration change with time at the outlet of the adsorbing layer during the decomposition phase in Example 2 of the present invention which will be described later.

Then, the adsorption phase was switched to the decomposition phase. The processing chamber was maintained at 25 ° C., and an ozone-containing gas consisting of 20% of O$_3$, 76% of O$_2$ and 4% of H$_2$O and generated from a water electrolysis ozone generator was dissolved in water to provide an ozone-containing water containing ozone at a concentration of 1–10 ppm, which was introduced at a superficial velocity of 0.01 m/sec into the processing chamber in a direction opposite to the waste gas flow to oxidize and decompose the adsorbed ethanol. The concentrations of ethanol and ozone at the outlet of the processing chamber were measured. The change with time of the concentrations of ethanol and ozone at the outlet of the processing chamber are shown in FIGS. 7 and 8, respectively, in which a line A relates to the mesoporous silicate, a line B relates to the dealumination faujasite, a line C relates to the high-silica pentacile zeolite, and a line D relates to the silica gel.

From the adsorbable period noted above, it is assumed that the adsorbed amount of ethanol is in the order of mesoporous silicate>dealumination faujasite>high-silica pentacile zeolite>silica gel. Further, it is seen from FIG. 8 that the leakage of the ozone begun about 1 hour after the start of the decomposition phase for the mesoporous silicate, the dealumination faujasite and the high-silica pentacile zeolite. Thus, it is assumed that the ethanol adsorbed on the high-silica adsorbents was decomposed by ozone during that period of time. However, the leakage of ozone was begun about 0.2 hours after the start of the decomposition phase for the silica gel.

EXAMPLE 3

A water containing 10 ppb of 2-MIB was processed instead of the water containing ethanol in the same manner as in Example 2, except that the ozone concentration of the ozone-containing water was set at 1 ppm. As a result, the concentration of 2-MIB in the adsorption-treated water was maintained at 0.1 ppb or less (substantially undetected).

As described above, the present invention is directed to the processing of a polluted fluid containing pollutants. In the present invention, a high-silica adsorbent is used to adsorb and concentrate pollutants from the polluted fluid on the adsorbent, and ozone is reacted with the pollutants adsorbed on the adsorbent, making it possible to efficiently decompose and remove the pollutants, and to utilize much more efficiently ozone for the decomposition than in the prior art.

Further, the method of the invention makes it possible to adsorb a relatively small amount of a specific pollutant present together with a relatively large amount of the other pollutants in a polluted fluid, and to decompose the specific pollutant on the adsorbent, with the result that the decomposition of ozone by the other pollutants can be effectively suppressed, the selective removable of the specific pollutant can be accomplished. For example, dioxin can be selectively adsorbed from a dioxin-containing gas, such as a refuse incinerator exhaust gas, containing a large amount of the other pollutants in addition to dioxin and effectively decompose the adsorbed dioxin by co-adsorbing ozone on the adsorbent. In the prior art, a dioxin-containing gas can not be effectively processed by the treatment with ozone. Further, malodorous components can be selectively adsorbed from a malodorous component-containing water, such as sedimented water in a water-purifying plant, containing a large amount of the other pollutants in addition to malodorous components, and effectively decompose the adsorbed malodorous components by co-adsorbing ozone on the adsorbent. In the prior art, a malodorous component-containing water can not be effectively processed by the treatment with ozone.

In addition, according to the present invention, the ozone-related equipment can be made compact as compared to the case where ozone is directly introduced into a large amount of polluted fluid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for processing a polluted fluid containing at least one pollutant, consisting essentially the steps of:

passing the polluted fluid through an adsorbing layer consisting of a mesoporous silicate adsorbent which has a silica/alumina ratio of 20 or more and is capable of adsorbing both ozone and at least one pollutant on said adsorbent; and bringing ozone into contact with said adsorbing layer to absorb said ozone on said adsorbent, thereby oxidizing and decomposing the pollutant adsorbed on said adsorbent by said ozone adsorbed on said adsorbent, while stopping the flow of said polluted fluid.

2. The method according to claim 1, wherein said polluted fluid contains a plurality of pollutants at least one of which is preferentially adsorbed by said adsorbent.

3. The method according to claim 1, wherein the fluid having passing through said adsorbing layer is separately processed to remove unadsorbed pollutants.

4. A method for processing a polluted fluid containing at least one pollutant, consisting essentially the steps of:

providing at least one processing chamber containing an adsorbing layer consisting of a mesoporous silicate adsorbent which has a silica/alumina ratio of 20 or more and is capable of adsorbing both ozone and at least one pollutant; and effecting, in said processing chamber, a processing cycle including an adsorption phase in which the polluted fluid is passed through said adsorbing layer to adsorb at least one pollutant on said adsorbent and the fluid having passed through said adsorbing layer is discharged from said processing chamber, and a decomposition phase in which ozone is brought into contact with said adsorbing layer which has adsorbed said pollutant to adsorb said ozone on said adsorbent, thereby oxidizing and decomposing the pollutant adsorbed on said adsorbent by said ozone adsorbed on said adsorbent, while stopping the flow of said polluted fluid.

5. The method according to claim 4, wherein there are provided a plurality of processing chambers each filled with the high-silica adsorbent; and wherein at least one processing chamber is subjected to said adsorption phase, while the other processing chamber is subjected to said decomposition phase.

6. The method according to claim 4, wherein said polluted fluid contains a plurality of-pollutants at least one of which is preferentially adsorbed by said adsorbent.

7. The method according to claim 4, wherein the fluid discharged from the processing chamber during the adsorption phase is separately processed to remove unadsorbed pollutants.

8. The method according to claim 4, wherein said polluted fluid is a polluted water or gas.

* * * * *